Dec. 2, 1958  H. FORWALD  2,862,476
OIL PRESSURE OPERATING DEVICE FOR ELECTRIC CIRCUIT BREAKERS
Filed Feb. 15, 1955
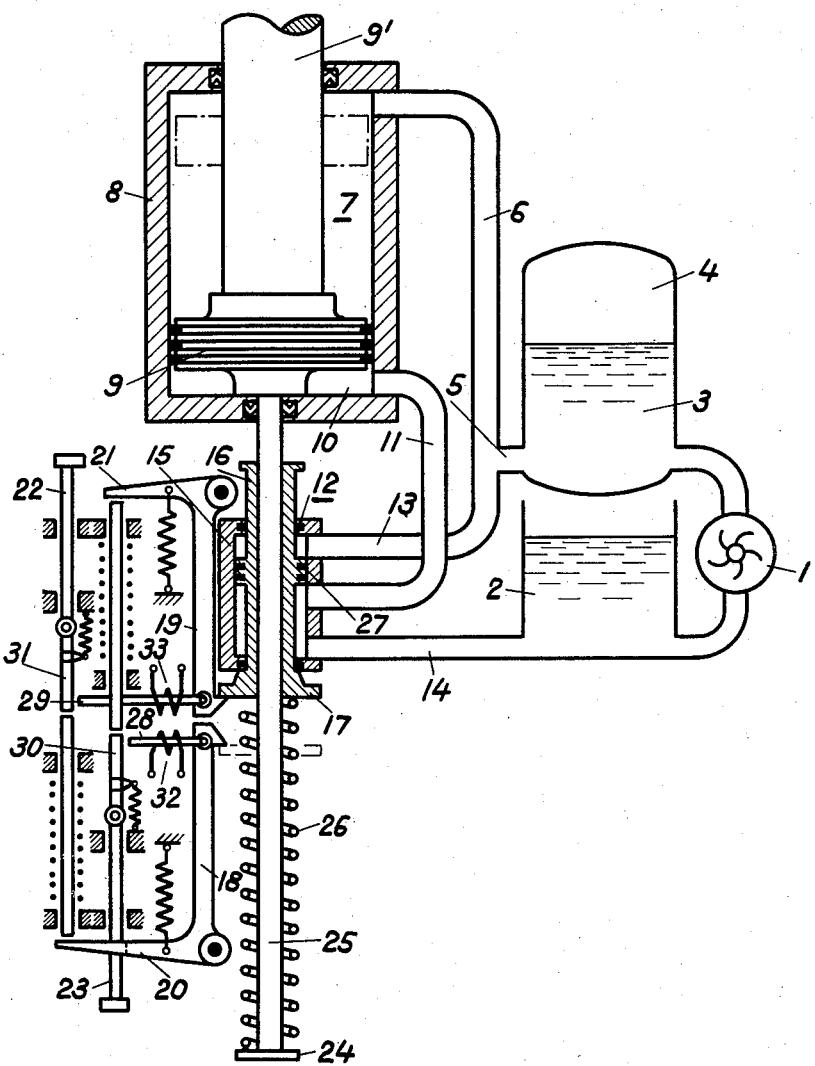
INVENTOR.
Haakon Forwald
BY
Attorney.

2,862,476

OIL PRESSURE OPERATING DEVICE FOR ELECTRIC CIRCUIT BREAKERS

Haakon Forwald, Ludvika, Sweden, assignor to Allmanna Svenska Elektriska Aktiebolaget, Vasteras, Sweden, a corporation of Sweden Application February 15, 1955, Serial No. 488,211

Claims priority, application Sweden February 17, 1954

4 Claims. (Cl. 121—38)

The present invention relates to an operating device especially for electric circuit breakers, in which oil under pressure is used for driving an operating piston. The main feature of the invention is that the oil pressure for moving the piston is controlled by a slide valve, which, in turn, is controlled in the one direction by a spring actuated by the operating piston, whereas it, in the other direction, is operated by the oil pressure, the slide valve in its end positions being arrested by locking devices actuated manually, electro-magnetically or in some other way.

The invention is best understood with reference to the accompanying drawing, where 1 designates an oil pump, which pumps oil from an oil magazine 2 into an air dome 3, which, above the oil level, contains a quantity of air or gas. The air dome is by an outlet pipe line 5 and a pipe line 6 in communication with a space 7 in the cylinder 8, in which the operated piston 9 moves. The piston 9 is connected by a stem 9′ with the circuit breaker not shown on the drawing. The other space 10 in the operating cylinder is through the pipe line 11 through the slide valve 12 and a pipe line 13 in communication with the air dome 3. The slide valve 12 is further through a pipe line 14 in communication with the oil magazine 2. The slide valve itself consists of a valve housing 15, in which the slide 16 moves. The slide 16 is in the lower end provided with a collar or a shoulder 17, which alternately is caught by the pawls 18 and 19, the pawl 18 of which acts to hinder the upward motion of the slide, whereas the pawl 19 hinders its motion downwards. The pawls 18 and 19 are through the medium of levers 20 and 21 actuated by operating rods 22 and 23, respectively. The actuation of said operating rods, which are used for the closing and opening of the circuit breaker, causes the pawls 18 and 19 to be liberated. Between the slide 16 and a shoulder or a washer 24 on a stem 25 joined with the operating piston 9, a helical spring 26 is arranged.

The arrangement acts in the following way:

When the operating device is in the position corresponding to an open circuit breaker, the piston 9 is in the bottom of the cylinder 8, and the pressure prevailing in the air dome acts on the upper side of the piston while the same pressure acts downwards on the surface 27 of the slide 16 and tends to move it downwards. This motion is, however, hindered by the pawl 19, which is in contact with the lower side of the collar 17.

When closing the circuit breaker, the operating rod 23 is actuated upwards, whereby its upper end acts on the lever 21, so that the pawl 19 leaves the collar 17. Under the influence of the oil pressure prevailing on the piston surface 27, the slide 16 is now moved downwards, and the spring 26 is compressed a little. The pressure on the surface 27 is, however, sufficient for compressing the spring so far that the pawl 18 can grasp the upper surface of the collar 17. When the slide has come into this position, oil under pressure can flow from the air dome 3 through the pipe line 13 into the pipe line 11 and from there into the space 10 and move the piston 9 upwards, so that the circuit breaker is closed. While the piston 9 moves upwards, the stem 25 is also drawn upwards, so that the spring 26 is further compressed and remains in this position, until the circuit breaker is to be released again.

The release takes place by actuating the pull rod 22 downwards, so that it acts on the lever 20, thereby liberating the pawl 18 from the collar 17, the slide 16 then being moved upwards by the spring 26 against the action of the oil pressure acting on the surface 27. When the slide has come in its upper position, the oil in the space 10 can escape through the pipe lines 11 and 14 to the magazine 2, whereas the oil from the air dome 3 can flow through the pipe line 6 into the space 7 and move the piston 9 downwards. The two pawls 18, 19 are mutually blocked by the rods 28 and 29, which act on the linked parts 30 and 31 of the rods 23 and 22 respectively. This blocking device acts so that, if for instance the pawl 19 is free from the collar 17 and the linked part 31 of the rod 22 has been swung to the left, the actuation of the rod 22 cannot be transmitted down to the lever 20, so that the pawl 18 cannot be liberated.

In electrically operating the device, the rods 22 and 23 are not actuated, but instead the pawls 18 and 19 are actuated by the coils 32 and 33.

I claim as my invention:

1. An oil pressure operating device for electric circuit breakers, comprising an operating piston and cylinder, an oil magazine for the delivery of oil under pressure to the cylinder, a slide valve moved in one direction by oil pressure for controlling the delivery of oil to the cylinder, spring means controlled by said piston for moving the slide valve in the other direction, means connecting one end of the cylinder in permanent fluid communication with the oil magazine, means connecting the opposite end of the cylinder in fluid communication with the said slide valve and connecting such valve in fluid communication with the oil magazine so that movement of the slide valve controls the movement imparted to the piston by the oil pressure from the magazine, and actuating means including a pawl device for retaining the slide valve in each of its end positions.

2. A device according to claim 1 comprising manually actuated means for the actuation of said pawl devices.

3. A device according to claim 1 comprising electro-mechanical means for the actuation of said pawl devices.

4. In an electric circuit breaker, hydraulic operating means comprising a cylinder, an operating piston movable in said cylinder and dividing it into two compartments, a magazine for the supply of an operating pressure medium, means providing permanent communication between said magazine and one of said compartments, a slide valve controlling the communication of the other compartment with said magazine, a spring device for imparting sliding movement to the said valve, two blocking members for arresting movement of the said valve in its two end positions, means whereby the slide valve when released by one of said blocking members is moved by the pressure medium in one direction and during such movement puts the said spring device under initial tension, and means whereby the spring device is further actuated by the operating piston for moving the slide valve in the other direction when said valve is released by the other blocking member.

References Cited in the file of this patent

UNITED STATES PATENTS

| | | |
|---|---|---|
| 752,491 | Warren | Feb. 16, 1904 |
| 1,158,717 | Raber | Nov. 2, 1915 |
| 1,230,150 | Geraghty | June 19, 1917 |
| 1,329,553 | Seator | Feb. 3, 1920 |
| 1,378,625 | Seator | May 17, 1921 |
| 1,826,363 | Miedbrodt | Oct. 6, 1931 |
| 1,845,176 | Palm | Feb. 16, 1932 |
| 2,159,879 | Dewandre | May 23, 1939 |
| 2,441,412 | Haller | May 11, 1948 |
| 2,523,572 | Jansson | Sept. 26, 1950 |